United States Patent
Willett

(10) Patent No.: US 9,521,927 B2
(45) Date of Patent: Dec. 20, 2016

(54) ROASTING OVEN

(75) Inventor: Paul Eaton Willett, Whiteside (AU)

(73) Assignee: TECHNOBAKE PTY LTD, Whiteside Qld (AU)

( * ) Notice: Subject to any disclaimer, the term of this patent is extended or adjusted under 35 U.S.C. 154(b) by 440 days.

(21) Appl. No.: 14/126,660

(22) PCT Filed: Jun. 15, 2012

(86) PCT No.: PCT/AU2012/000697
§ 371 (c)(1),
(2), (4) Date: Feb. 5, 2014

(87) PCT Pub. No.: WO2012/171076
PCT Pub. Date: Dec. 20, 2012

(65) Prior Publication Data
US 2014/0224133 A1    Aug. 14, 2014

(30) Foreign Application Priority Data

Jun. 17, 2011 (AU) ............................... 2011902381
Jul. 20, 2011 (AU) ............................... 2011902895
Dec. 13, 2011 (AU) ............................... 2011905179

(51) Int. Cl.
A47J 37/04  (2006.01)
A21B 3/04   (2006.01)
F24C 15/32  (2006.01)
A21B 1/26   (2006.01)
A21B 1/44   (2006.01)
A21B 1/50   (2006.01)

(52) U.S. Cl.
CPC ............... A47J 37/041 (2013.01); A21B 1/26 (2013.01); A21B 1/44 (2013.01); A21B 1/50 (2013.01); A21B 3/04 (2013.01); A47J 37/043 (2013.01); A47J 37/049 (2013.01); F24C 15/322 (2013.01)

(58) Field of Classification Search
CPC ...... A47J 37/043; A47J 37/049; A47J 37/041; A21B 3/04; A21B 1/50; A21B 1/26; A21B 1/44
USPC .............. 99/352, 426, 427, 443 C, 446, 476; 426/231, 233, 520, 523
See application file for complete search history.

(56) References Cited

U.S. PATENT DOCUMENTS

| 1,990,580 A  |   | 2/1935  | Ashby |
|--------------|---|---------|-------|
| 3,074,360 A  | * | 1/1963  | Vaughan ................. A21B 1/40 266/274 |
| 5,329,916 A  | * | 7/1994  | Lygum ..................... A21B 1/48 126/20.1 |
| 5,442,999 A  |   | 8/1995  | Meister |
| 5,717,192 A  | * | 2/1998  | Dobie .................... A21B 1/245 126/21 A |
| 6,054,686 A  |   | 4/2000  | Pauly et al. |
| 6,656,036 B1 | * | 12/2003 | Quigley ................ F26B 21/004 126/19 R |
| 2005/0204934 A1 | | 9/2005 | Robertson |

* cited by examiner

Primary Examiner — Thien S Tran
(74) Attorney, Agent, or Firm — Mintz Levin Cohn Ferris Glovsky and Popeo, P.C.; Muriel Liberto, Esq.

(57) ABSTRACT

An oven suitable for roasting chickens is provided. The oven includes an oven chamber having side walls, a floor, at least one door, and a ceiling, and a plurality of heating levels. A method of roasting items in an oven is provided.

21 Claims, 13 Drawing Sheets

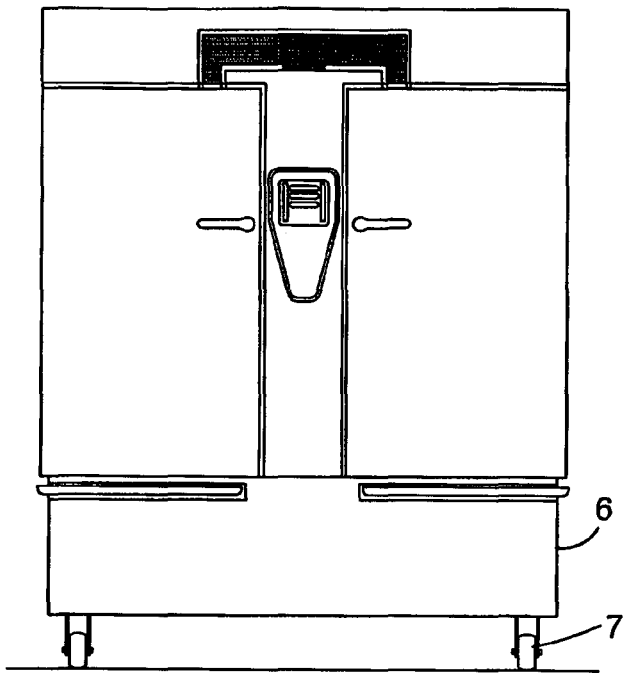
FIG. 1(A)
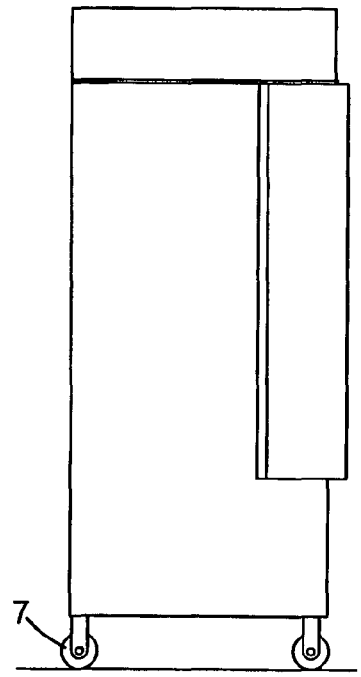
FIG. 1(C)
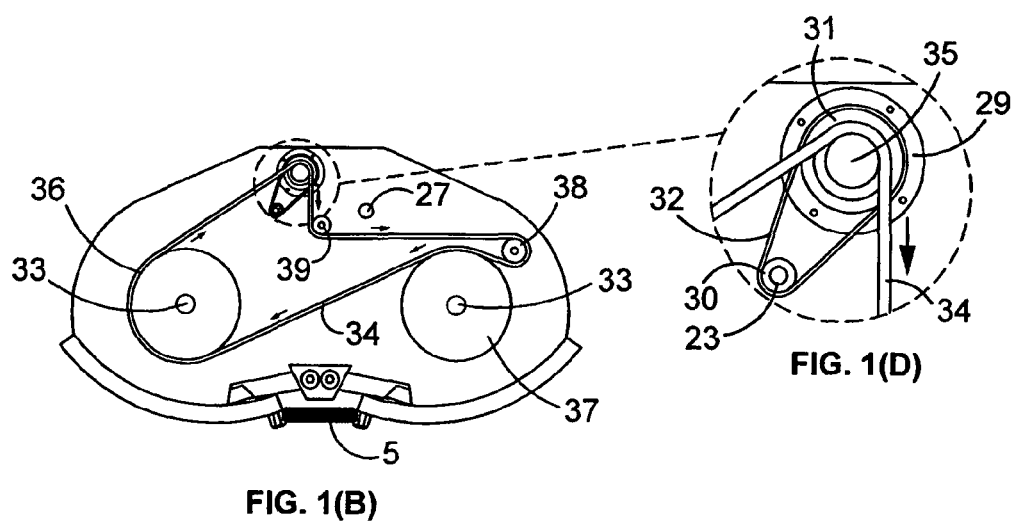
FIG. 1(B)
FIG. 1(D)

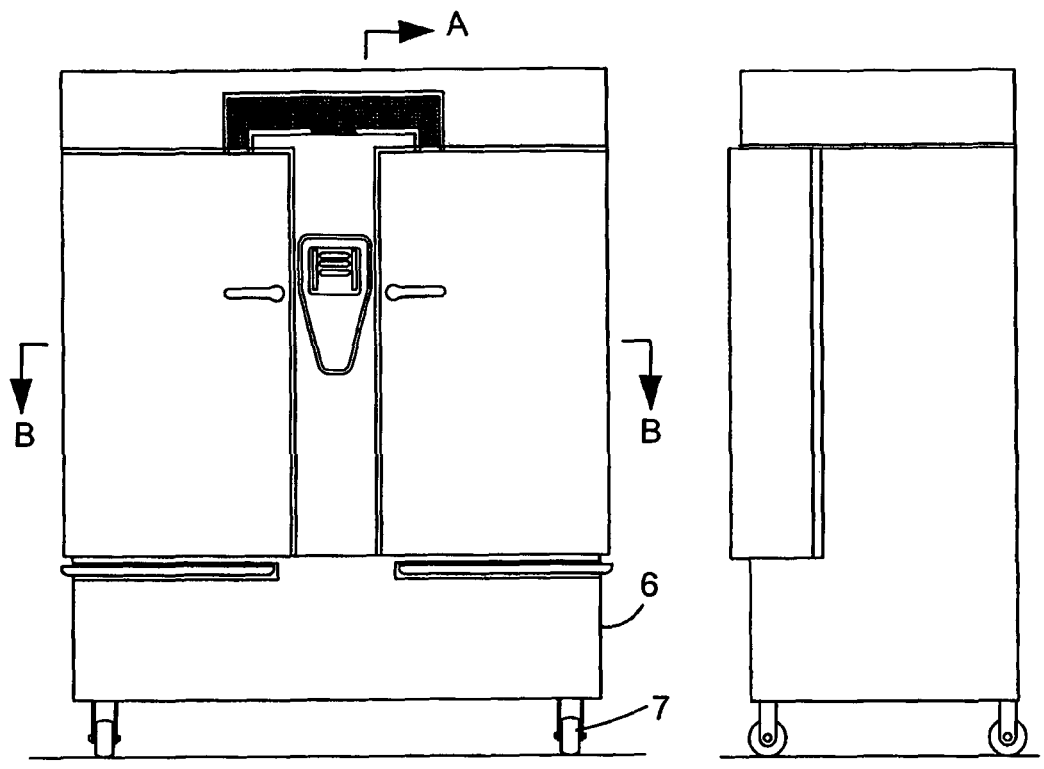
FIG. 2(A)
FIG. 2(B)
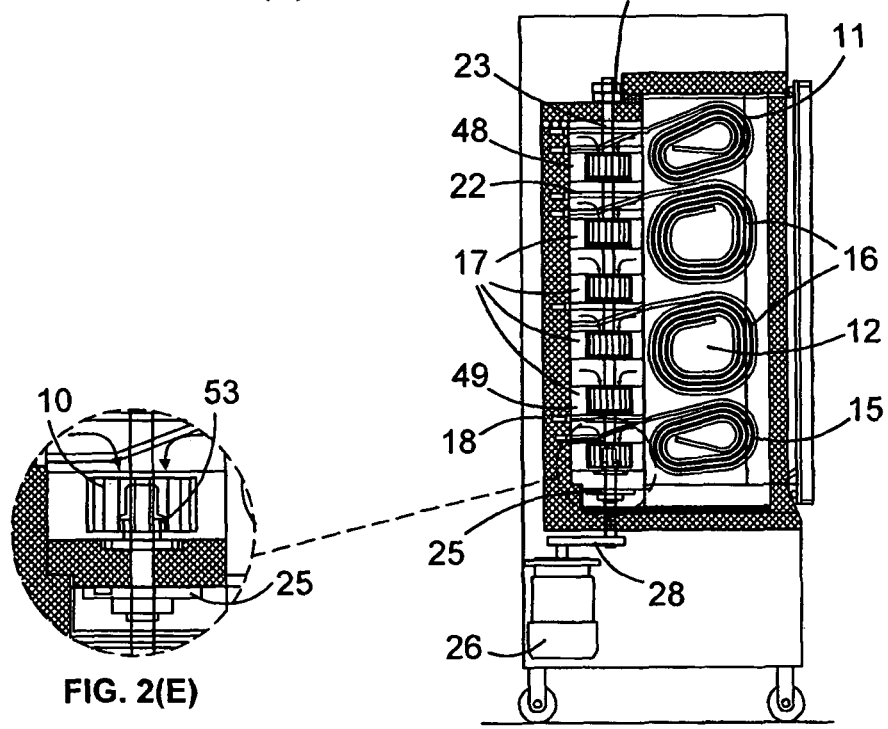
FIG. 2(E)
FIG. 2(C)

ROASTING OVEN

FIELD OF THE INVENTION

This invention relates to ovens and in particular to ovens which are able to provide a steam environment during the roasting process.

BACKGROUND OF THE INVENTION

While the invention will be described with reference to the baking of chickens, which are the most common baked meat or poultry commercially available, and is particularly suited to roasting chickens, the invention is not solely limited to use with chickens and may be used on other items baked or roasted in an oven.

Ovens for baking chickens and the like product come in many forms. One of the most popular designs uses convection heat from a fan, and the product within the oven may be rotating on a rack, or stationary. Rotating is however generally thought to be the most even baking, as all products on each tray on the rack can experience the same heat history. The heat source is generally electric elements, or gas or fuel fired by way of a heat exchanger.

When baking chickens in particular, the bake and moisture retention in the product is greatly improved by the use of low pressure but high humidity steam. The finish on the outside skin of the chicken is generally glossier and crispier, with a golden colour. The method of introducing steam into the oven is generally achieved by use of a quick response boiler or steam generator. In this process the water is either kept just below boiling point and raised beyond boiling point when steam is required, or water is introduced over heated ballast, in measured amounts.

These systems have generally fallen out of favour because the boiler or steam generator is remote to the oven chamber itself and requires ongoing service and maintenance to ensure that the scale build up does not block the working components. The safety surveillance systems are also quite complex, and are prone to failure due to the high heats sometimes experienced.

The other system presently used is a water spray that is directed into the circulating air/heat fan. The fan causes the water to break up into small particles and these are directed towards the heating elements or exchanger tubes. Because the flow of the air must pass by the elements or tubes, some of the water spray is lost, and has a non beneficial effect on the heating surfaces. The colder water may also run off the ovens hot surfaces, causing them to buckle and, or, cool. The end result can be an oven that has excess waste water coming from it and going to drain. In essence, the oven has a water cooling system instead of a steam generating system.

The heat inside the oven is circulated by one or more paddle type fans, and these can be multi-directional, so reversing their rotation during the bake may improve bake quality. Generally speaking however, the air is not well directed into specific areas of the oven, and is simply moved about as uniformly as possible.

When baking chickens, the fat and contents of baking is generally allowed to flow from the racks onto the floor of the oven. The oven floor is generally drained towards the middle and water and fat can discharge to waste. The ovens may have a self cleaning function, where in hot water sprays and chemicals and neutralizers are introduced at days end to clean the inner cell and components of fat build up etc. The oven floor is generally difficult to clean thoroughly because the fat drips constantly onto it, and then burns off, causing smoke and aroma contamination of the baked product.

It is an object of the invention to provide an oven design which overcomes one or more of the above problems.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to one aspect of the invention, there is provided an oven comprising at least one oven chamber, each oven chamber comprising side walls, a floor and a ceiling, each oven chamber having a plurality of heating levels; at least one heating element cavity external to and communicating with the oven chamber, each heating element cavity comprising at least one heating element; a plurality of air inlets into the oven chamber from the heating element cavity corresponding to the heating levels in the oven chamber and at least one outlet for return air from the oven chamber into the heating element cavity; and air distributor corresponding to each air inlet, each air distributor circulating air from the heating element cavity to the oven chamber.

Preferably a water inlet to supply water to the heating chamber, and a water outlet in the floor to regulate the level of water in the oven chamber are provided.

In a preferred form of the invention, a secondary heating element is provided to heat the floor. The secondary heating element is preferably located in the floor and is provided to generate stream from water in the oven chamber.

The primary heating element is preferably configured to provide convection heating to the oven chamber. The primary heating element is provided outside the oven chamber within a cavity. The cavity communicates with the oven chamber to move air from the oven chamber passed the primary heating element or elements and back to the oven chamber.

The steaming system for the oven chamber comprises the heating elements in the floor, the water inlet or inlets and the water outlet. A controller may be provided to operate the water inlet preferably in the form of sprayers to project water onto the heated oven floor. The oven floor is heated sufficiently to produce steam from the water. While the heating elements may heat the oven floor to be at a temperature below vaporisation temperature (100° C.) for the water and slowly increased to above this temperature, a charge of steam can be generated by having the oven floor at a temperature so that a large amount of steam is generated when the water makes contact.

The water outlet which may be located centrally in the oven floor directs fluids from the oven chamber to a collection tank. A further water inlet may be positioned centrally to assist this drainage operation.

The inlet to the heating element cavity may be provided with a filter and at least one fan to draw air past the filter into proximity with the heating elements or elements. The cavity may be provided with at least one and preferably multiple outlet vents to heat multiple levels in the oven chamber.

The oven chamber is preferably provided with at least one rack upon which items are roasted. There may be multiple levels of racks stacked vertically and the racks are preferably rotatable about an axis in the oven chamber. The volume of air from each outlet vent is controlled by a separate air distributer or fan so that the volume of air exiting each outlet vent can be controlled. This allows the temperature of the oven chamber at different vertical levels to be controlled more effectively.

Preferably there are a plurality of levels of racks or item holders and a corresponding number of outlet vents projecting heated air onto the product to be roasted. In the case of chickens, the product is retained on racks or item holders which extend from the central rotating axis. Preferably each item holder is adapted to support a single item to be roasted. The chickens are positioned on the racks so that the breast and thighs of the chicken are positioned away from the central rotating axis but in the path of the heated air. Each rotating rack passes directly through the path of heated air exiting the outlet vents.

The air from the vents preferably has an upward directional component and so is directed at an angle upwardly from the horizontal. Preferably the rotating path of the chicken and particularly the breast and thighs of the chicken coincide with the path of the heated air into the oven chamber.

In a preferred form of the invention, the further comprises a rotatable centrally mounted item holding frame detachably mounted in the oven chamber. The frame includes at least one item holder mounted to a rotatable shaft. The rotatable shaft is mounted to a pivotally mounted loading arm which is operable between a baking position where the frame is wholly within the oven chamber and a loading and unloading position where the item frame is wholly outside of the oven chamber. The item holding frame is centrally mounted in the baking chamber within a shaft assembly in the baking chamber of the oven.

The shaft assembly is provided with a rack drive mechanism which is engageable with a drive key associated with the rotatable shaft to rotate the shaft. The air distributor comprises a plurality of fans, coaxially engaged on a fan drive mechanism. The fan drive mechanism is coupled to the rack drive mechanism and both are driven from a single motor.

The oven further includes an oven door, the oven door opening on a travel path and the loading arm transports the item holding frame passed the oven door to the loading and unloading position. The oven chamber has a circular cross section and the radius of the item racks on the item holder frame is between 60 to 85% of the diameter of the baking chamber.

In another aspect of the invention, there is provided an item holder for supporting a single item in an oven, the oven having a rotatable shaft for supporting the item holder in the oven, the item holder comprising a frame connection arm connectable to the rotatable shaft; and two item support arms connected in a substantially U-shaped configuration. One item support arm is connected to the frame connection arm whereby the two item support arms form a concave shape which receives the item to be roasted.

Preferably the two item support arms curve downwardly and away from the connection with the frame connection arm. In use, the lowermost point of the item support arms is below the connection with the frame connection arm and the connection between the item support arms. As the item holder slopes generally downwardly from the frame connection arm, there is a tendency for items on the holder to slide down the item holder under gravitational forces. The shape gives the item holder the ability to cradle and support the item on the item holder. The connection between item support arms provides a stop for downward movement of the item on the holder without unduly affecting the heat flow onto the item. In the case of chickens, the positioning of the support arms does not produce scold marks on the chicken in positions which detract from the appearance of the cooked item.

The invention may further be provided with a washing system in which the rotatable central shaft has a non-circular cross section and the water inlet includes at least one water sprayer or atomiser which directs water towards the rotatable shaft. The water contacts the non-circular surfaces of the rotatable shaft and deflects at an angle dependent on the angle between the shaft and the water nozzle direction. This deflects the water in a continually varying direction as the shaft rotates enabling cleaning fluid to be dispersed around the oven chamber.

In a further aspect of the invention, the oven comprises at least two chambers, a rotatable centrally mounted item holding frame detachably mounted in each oven chamber including at least one item holder mounted to a rotatable shaft in each oven chamber, the item holding frames being centrally mounted in the baking chambers within a shaft assembly in the baking chambers of the oven, the shaft assembly being provided with a rack drive mechanism which is engageable with a drive key associated with the rotatable shafts to rotate the shafts, the plurality of fans coaxially engaging on a fan drive mechanism whereby the fan drive mechanism is coupled to the rack drive mechanism and both are driven from a single motor, In another aspect of the invention, there is provided a method of roasting items comprising the steps of
    heating an oven chamber to a predetermined temperature by circulating air through a heating element cavity containing at least one heating element, the heating element cavity being external to the oven chamber and communicating with the oven chamber through a plurality of vented air inlets into the oven chamber from the heating element cavity
    supporting the items to be roasted on a plurality of levels of item holders, the number of levels of item holders corresponding to the number of vented air inlets into the oven chamber, the item holders being rotatable about a central axis so that the item to be roasted is rotated generally in a horizontal plane which coincides with or intersects the path of the heated air entering the oven chamber.

The method may further include the steps of heating the floor of the oven to a temperature at which steam can be produced upon contact with water, introducing water onto the floor, and controlling the amount of water on floor to control the production of steam.

In the above aspect, the amount of water on the floor may be controlled by regulating the water introduced and water drained from the floor. The oven chamber is heated by primary heating element or elements in a cavity in the wall and the floor may be separately heated preferably by a secondary heating element or elements in the floor or a cavity in the floor.

In a preferred form of the above method the items to be roasted are chickens. The item holders mount the chickens into a position where the spine of the chicken is inclined to the horizontal and aligned substantially in the direction of rotation of the item holders. Thus the motion of the chickens around the rotatable shaft is substantially perpendicular to the radial direction of the plane of rotation.

The chicken is supported by the item holder in a position whereby the back of the chicken body faces towards the floor of the oven chamber, the spine having being inclined at an angle of less than 45 degrees to the horizontal and aligned substantially perpendicular to the radial direction of the plane of rotation.

The vented air inlets are directed at the chickens on the item holder, the chicken body rotating in a direction around the centrally mounted shaft so that the top end (wings and breast end) contact heat from the vents first.

In an embodiment, the oven chamber is heated by air circulating through the cavity. Once heated by the heating element or elements, the air enters the oven chamber at a plurality of levels through a plurality of outlets to heat the oven chamber at a respective number of levels.

The product to be roasted may be supported on a plurality of racks and the number of racks preferably corresponds to the number of outlets. The racks may be rotatable about a centrally mounted shaft and so the product to be roasted and particularly the breast and thighs of the chicken is rotated generally in a horizontal plane which coincides or intersects the path of the heated air entering the oven chamber.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIGS. 1(a), 1(b), 1(c) are respectively the front, plan and end view of an embodiment of the invention, FIG. 1(d) is an exploded view of the indicated section of FIG. 1(b);

FIGS. 2(a), 2(b), 2(c) and 2(d) are respectively the front view, end view, sectional view through line A-A of FIG. 2(a), and sectional plan view through line B-B of FIG. 2(a), and FIG. 2(e) is an exploded view of a section of FIG. 2(c);

FIG. 3 is the sectional view of FIG. 2(d) showing the direction of heated air at chickens on the item holders and FIG. 3(a) is an exploded view showing the area of the chicken targeted by the heated air flow;

DETAILED DESCRIPTION OF THE EMBODIMENTS

Figure 2D:
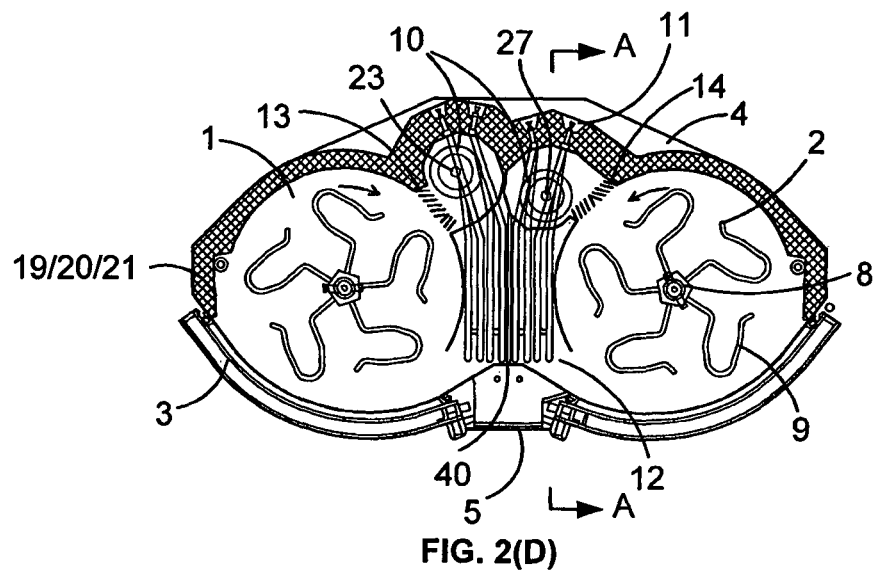

According to an embodiment, the invention is an oven comprising at least one oven chamber, each oven chamber comprising side walls, a floor and a ceiling, each oven chamber having a plurality of heating levels. The invention described herein may be used with a rotating or stationary baking rack, but in the embodiment shown, the oven chamber is cylindrical to accommodate a rotating rack. There may be multiple levels of racks stacked vertically and the racks are preferably rotatable about an axis in the oven chamber.

The primary heating elements are provided outside the oven chamber within a cavity in the side wall for the heating chamber. In the preferred embodiment, a secondary heating element may be provided to heat the floor. The embodiment of the oven further includes a series of propeller type fans 1 for hot air circulation. The fan moves air from oven chamber 2, and through the inlet vents 3 past heating elements 4 and pushes the heated air through outlet vents 5. The vents can be set to allow the air to circulate in such a manner so as to ensure even baking of all chickens on that level, and by adjusting the amount of fan blade pitch or speed, the even baking of the oven from top to bottom can be adjusted and corrected until very even throughout the oven. The chickens can either rotate around a central shaft 6 or be stationary on a rack or fixed shelving (not shown).

FIG. 1 illustrates the front view plan and end view of the oven in its twin chamber configuration. The oven can be manufactured as a single chamber or twin chamber model. The advantages of the twin chamber configuration are that it is less expensive to manufacture than two separate ovens, and the footprint is also smaller.

The sectional plan view B-B FIG. 2 shows the oven chambers 1 and 2 mounted side by side. Each chamber has its own door 3, insulated rear wall section 4 and shared control panel 5 that is preferably a computer and touch screen. The chambers are mounted on a common base 6 with castors or fixed legs 7.

The oven has at least one heating element cavity external to and communicating with the oven chamber. Each heating element cavity comprises at least one heating element, a plurality of air inlets into the oven chamber from the heating element cavity corresponding to the heating levels in the oven chamber and at least one outlet for return air from the oven chamber into the heating element cavity.

In FIGS. 2a, 2b, 2c, each chamber has a central driven rotatable shaft 8 and a driven array of holders 9 that rotate in the chamber. Coaxial fans 10 draw heat over heating elements or heat exchanger tubes 11 by way of heating cavity or duct 12 and blow the heated air through vanes 13 and 14. The vanes or louvers 13, 14 may direct the heated air upwardly onto rotating holders but preferably the direction of air is substantially horizontal.

Elements are mounted in the heating cavity or duct 12 as shown is sectional end view A-A FIG. 2c and are of different wattage, with the bottom most element pair 15 being typically 2 kw each, and the middle element pairs 16 being typically 1.2 kw each, and supplying four fan runner and fan housing assemblies 17. The top most element 11 is a single element similar to the bottom element 15. Elements 11, 15, 16 are terminated and connected through fan housing intake areas 18. Thermocouples 19, 20, and 21, FIG. 6 read the temperature adjacent to the fans 10 and each control their own respective element set. Bottom most element set 15 is controlled by thermocouple 19 the middle element sets 16 are controlled by thermocouple 20 and the very top element set 11 is controlled by thermocouple 21.

The air distributor for the oven comprises a plurality of fans, coaxially engaged on a fan drive mechanism. Fan runner assemblies are mounted commonly in one body, 22 (FIG. 2), comprising of the fan housings 17. Fan runners 10 are mounted on a common shaft 23. Bearing members 24, 25 being preferably stainless steel, are mounted at each end of fan shaft 23 and a'motor 26 drives both fan shafts 23 and 27 by a belt 28.

In FIGS. 1a, 1b, 1c, fan shaft 23 drives a gearbox 29 via pulleys 30 and 31 via a belt 32. Gearbox 29 then drives both shafts 33 by way of a chain 34 from sprocket 35 to larger sprockets 36 and 37. Sprocket idler 38 ensures that holders 9 in each chamber 1 and 2 rotate in opposite direction to one another. Spring loaded jockey sprocket 39 keeps chain at a constant tension.

Stainless steel divider sheet 40 separates each chamber from the other, ensuring the air flow and heat from elements 11/16/15 are segregated to each chamber.

Figure 3:
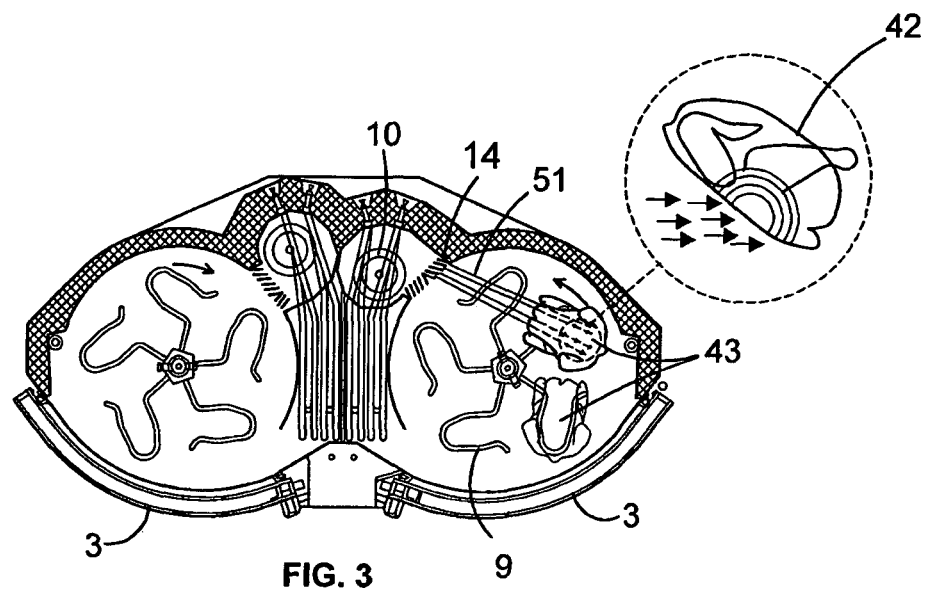

In FIG. 3, the item to be roasted or product being baked, ideally chickens, are mounted on an array of item holders 9 and the design of these permits the chickens 43 to be well displayed, with breast 42 and side of chicken generally facing towards the glass door 3 for best customer presentation.

The area of the chickens where the wings and thighs join at the body, are areas that have issues with 'bloody bone'. This is where the bones of the chicken are not totally mature when the chicken is slaughtered (about 6-7 weeks) and when cooked the bone looses blood and makes the cooked flesh around the bones appear uncooked. Despite the chicken meat being cooked at this point, to reduce or diminish this appearance, chickens are generally cooked longer resulting in the chicken being overcooked to ensure this red bone turns brown.

Figure 4A:
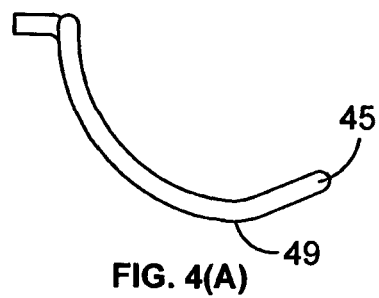
FIGS. 4(a), 4(b), and 4(c) are respectively the front, end and plan views of an item holder according to an embodiment of the invention.
Figure 4B:
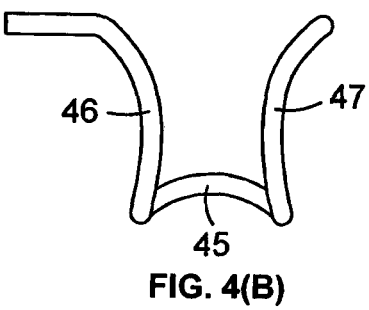
Figure 4C:
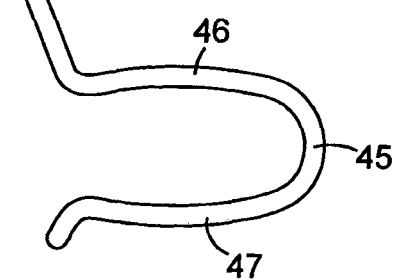
Figure 7:
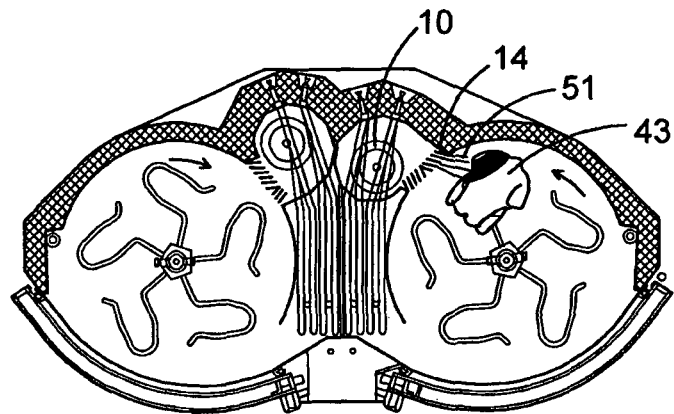
FIG. 7 is the sectional view of FIG. 2(d) showing the direction of heated air at chickens on the item holders.
Figure 8:
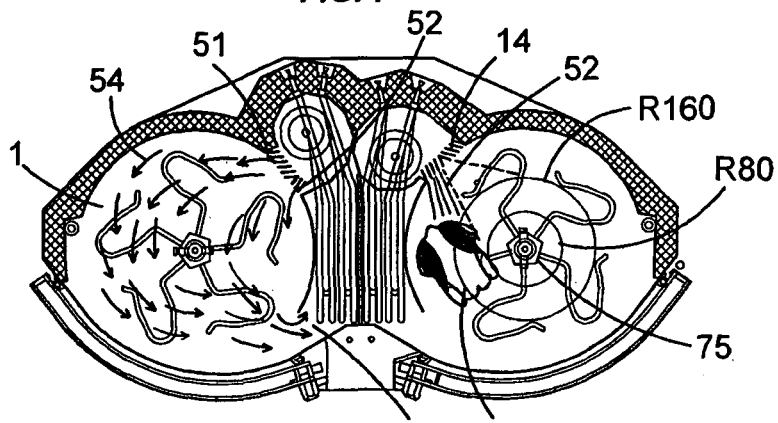
FIG. 8 is the sectional view of FIG. 2(d) showing the direction of heated air at chickens on the item holders and generally around the oven chamber.

The applicants have found that heat directed at these areas of the chicken as shown in FIGS. 3, 7, and 8 will bake this area more, especially as the hot air blowing on it is directly from the cavity containing the heating elements and so is hotter than the oven temperature. The chicken in these areas can then bake faster than the rest of the chicken. This preferential baking method allows the rest of the chicken to be baked to a core temperature of 70° C. while the areas 44 where redbone is likely to occur will have a core temperature above 85° C. Over-baking the flesh in the thigh joint areas is of little consequence to the moisture of the chicken meat as it is a fatty meat area and rarely goes dry. The fans therefore are required to direct even and uniform amounts of hot air to these sections of the chickens FIG. 4 illustrates the item holders 9 that allow chickens to be easily loaded and unloaded, with little or no skin left behind, or damage or scarring to the bird. The array of item holders 9, as seen in FIG. 3, ensures that each bird receives an even dose of heated air from fans 10 to the desired area, and crowding is avoided by the holders positioning of each bird.

The item holder 9 comprises a frame connection arm 44 connectable to the rotatable shaft; 75 and two item support arms 46, 47 connected in a substantially U-shaped configuration. One item support arm 46 is connected to the frame connection arm 44 whereby the two item support arms 46, 47 form a concave shape which receives the item to be roasted.

Preferably the two item support arms 46, 47 (FIGS. 4a, 4b, 4c) curve downwardly and away from the connection with the frame connection arm 44. In use, the lowermost point 49 of the item support arms 46, 47 is below the connection with the frame connection arm 44 and the connection 45 between the item support arms. As the item holder slopes generally downwardly from the frame connection arm, there is a tendency for items on the holder to slide down the item holder under gravitational forces. The shape gives the item holder the ability to cradle and support the item on the item holder. The connection 45 between item support arms provides a stop for downward movement of the item on the holder without unduly affecting the heat flow onto the item. In the case of chickens, the positioning of the support arms does not produce scold marks on the chicken in positions which detract from the appearance of the cooked item.

Figure 5:
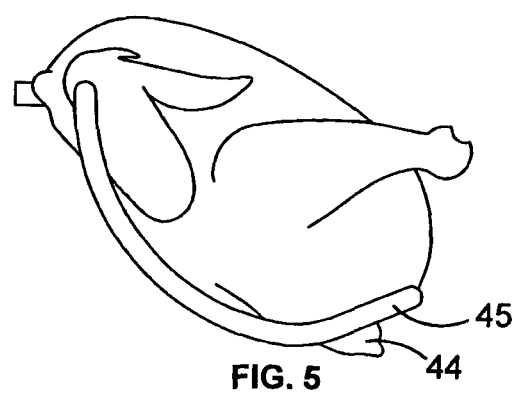
FIG. 5 is a side view of a chicken supported by the item holder of FIGS. 4(a), 4(b), and 4(c)

This is illustrated in FIG. 5. The item holder 9 is designed so that the tail section 44 of the item holder fits in the slightly raised bottom loop 45 and the chicken or bird is held inclined to the horizontal upright by the two curved support arms 46, 47 at an angle less than 60° and preferably less than 45° to the horizontal. The bottom or lowermost sections 49 holding the bird at its pelvis bone.

Figure 6A:
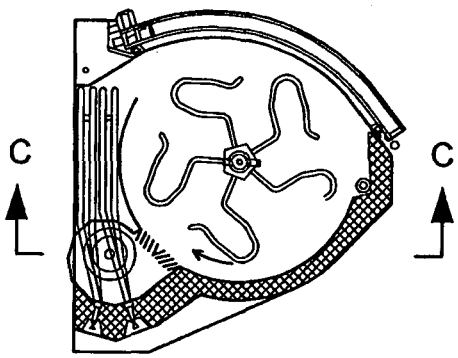
FIG. 6(a) is a plan view of one of two oven chambers shown in FIG. 1
Figure 6B:
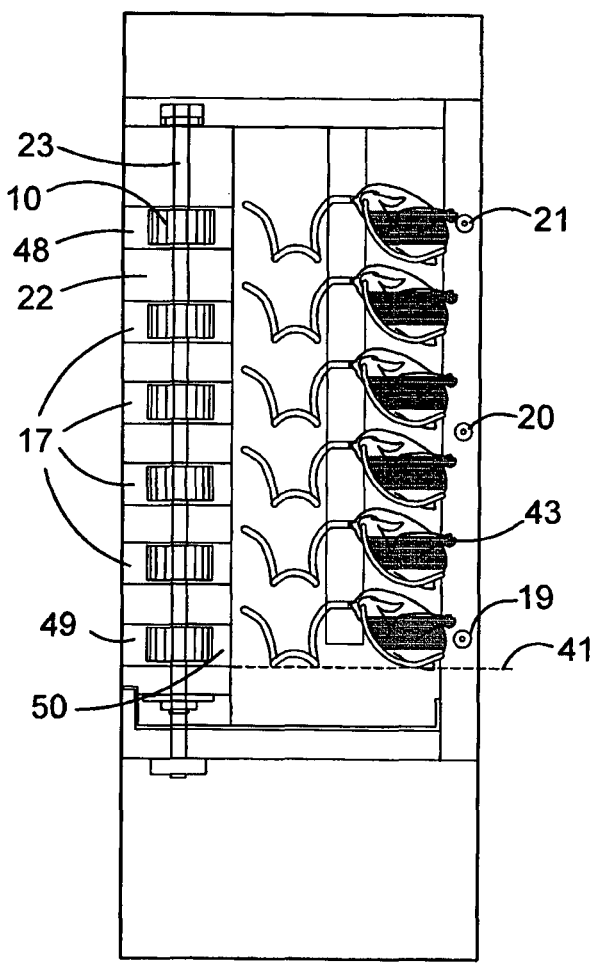
FIG. 6(b) is a sectional view through line C-C of FIG. 6(a)

Sectional side view c-c, FIG. 6b illustrates chamber 1 only in cross sectional elevation. Coaxial fan housings 17, 48, 49 with fan runners 10 and separate fan housing outlet 50 is situated at the same level as each array of item holders 9 and chickens 43 or product being baked. See horizontal alignment line 41

FIG. 3 illustrates air vent vanes 14 aligned so as to generally split the air flow into two paths. One path 51 brings the fan forced air and heat in direct contact with the bottom section of the chicken 43 and the area around the leg joints in particular.

As the chicken rotates past vent vanes 14, FIG. 7, the leg and thigh portion of the chicken is given additional heat from the direct hot air blast, and this shows coloration on the bird when baking.

FIG. 8 illustrates the chicken 43 rotated further, and air flow 52 path blowing on the internal section of the chicken to bake and colour that portion. FIG. 8 illustrates the alignment of the inner vane 14 of the air vent and its path generally intersects radius line at 160 mm from centre of central driven shaft 75.

For direction of air flow 52, its inner most vanes of vent 90 follows a path that generally intersects radius line at 80 mm from central driven shaft 75.

Figure 9:
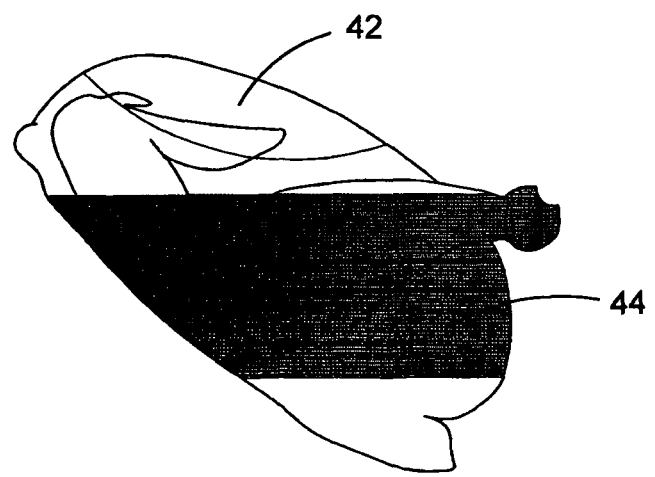
FIG. 9 is a side view of a chicken illustrating the areas of the chicken at which the heated air is directed.

Direct hot air blast is directed at sections of the chickens most difficult to bake. FIG. 9 44 illustrates the area of the chicken that requires more heat being in particular, the femur and pelvis, and muscle flanking the sternum. The hot air blast is typically 10 to 15° C., hotter than the oven chamber temperature.

These areas will bake faster than if they were in the conventional ovens circulating convection heat, permitting a faster bake and moister areas where the air blast does not fully effect being the breast 42. Bake time is therefore shortened, as the areas that customers see as often pink and undercooked, such as inside the thigh, are well baked, yet the areas such as the breast are baked with less heat allowing it to stay moister yet fully baked.

The presentation of the chickens on the turntable is most important for marketing purposes, where the oven is in full view of the customer. Another additional benefit of the array of item holders and their positioning in the oven is that the breast and legs of the chicken generally face outwardly during baking, as seen in FIG. 6. Thus with transparent walls, the theatre of the chickens baking is maximized.

Co-axial fan housings 17, 48, 49 are positioned so that they blow air onto the chickens in the preferred areas, see FIG. 6c, and the top most fan housing 48 is positioned slightly higher to permit thorough colouring of the top array of chickens as the top bird has no fans above it and so requires additional heat higher up on the body.

Lowermost fan housing 49 requires a seal system, 53 (FIG. 2) to avoid water leaking out through the base of fan housing 49.

FIG. 8 illustrates the air flow 54 around the chamber 1. Once hot air flow 51, 52 has imparted heat onto chickens in the direct air flow, the hot air continues to circulate around the chamber until it enters heating duct 12.

Heating elements 11, 16, and 15 are positioned in heating duct or cavity 12, (FIG. 2) or could be heat exchanger pipes from a gas burner.

The array of elements is such that the bottom elements 15 are of a larger wattage and larger total length than elements 16. This is a requirement to ensure additional heat is provided to the lower most birds. The generation of steam from the oven floor and the colder floor would otherwise reduce the amount of colour and bake on the bottom array of birds.

Similarly with the top most elements 11, the wattage may be higher to provide more heat to that array of birds.

The increased length of the element is an embodiment of the invention, ensuring that the sheath of element will not glow red or heat beyond generally black heat when the oven is running at high temperatures, typically 250 degrees C., and the element has been turned on continuously for the duration of the bake, typically 60 minutes. Avoiding the elements sheath getting to high temperatures is known to reduce the risk of fat deposits catching fire inside the oven compartment. The amount of smoke being generated from fat deposits, when the oven is baking or heating is also known to be less. Having elements with this low Watts Density, is seen as necessary where flavour contamination can occur within the oven, if fat deposits are permitted to burn on hot surfaces and heating elements.

The sheath of the element may also be made from a higher heat resistant material, to reduce the risk of corrosion and red heat surface temperatures.

Coaxial fans 10 draw air over the heating elements, and so keep the sheath temperature cooler, and also draw the higher temperature air from the oven and direct it onto the areas of the chicken where faster baking is required (see FIG. 9).

Modern roasting ovens use steam in addition to hot air to bake various products faster and retain more moisture within the product.

Steaming System

When roasting chickens, steam under low pressure but in high volume, can permit the birds to bake at a higher temperature, especially for the first 30 minutes of a typical 60 minute bake. The method in which steam is made in the oven is generally from a low pressure boiler or from water sprays running directly onto the heating elements and or hot surfaces. Boilers have service, reliability and high manufacture cost, while water sprays directly on heating elements can have a cooling effect in the oven, and cause a large amount of condensate that takes valuable heat to waste as the water drains from the oven floor. The fast generation of the steam is often not continuous but in bursts, to permit the quenched surfaces to recover heat. This fast increase in pressure within the oven, may cause excessive venting of heat and steam to the exhaust flue. Oven floors are hot and the dripping fat from chickens etc can cause burning of the fat on the hot floor surface.

To avoid this and the smoke and possible flavour contamination, the applicant has developed a steaming system which can be used incorporated in the oven of the invention or used with a conventional oven arrangement. The steaming system for the oven chamber comprises the water inlets providing water onto a hot floor. The streaming system also includes the secondary heating elements 9 in the floor, the water inlet or inlets and preferably the water outlet. A controller may be provided to operate the water inlet in the form of sprayers to project water onto the heated oven floor. The oven floor is heated sufficiently to produce steam from the water.

In the preferred embodiment, the oven floor 55, (FIG. 10), is designed with spray nozzles 56, 57 that fill the oven floor 55 with approx 2 liters of water. The continuous flooding of the floor permits the collection of fats to occur as well as any by-products of baking. The flooded floor also serves as a steam generating device, by heating the floor and its cavity 58 with a heat controlled electrical element 59. Thermocouple 60 in the floor cavity regulates heat in the cavity to typically 250 degrees C. when steam is required, and 130 degrees C. when the oven is at stand-by or steam is not required, but the fat collection system must be in operation.

Figure 10A:
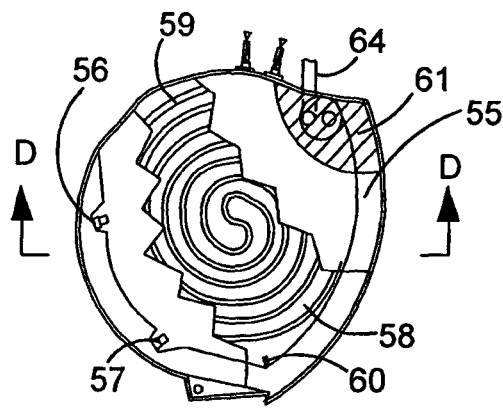
FIG. 10(a) is a fragmented plan view of the floor of one of two oven chambers and 10(b) is a sectional side view of an oven chamber taken along line D-D shown in FIG. 10(a)
Figure 10B:
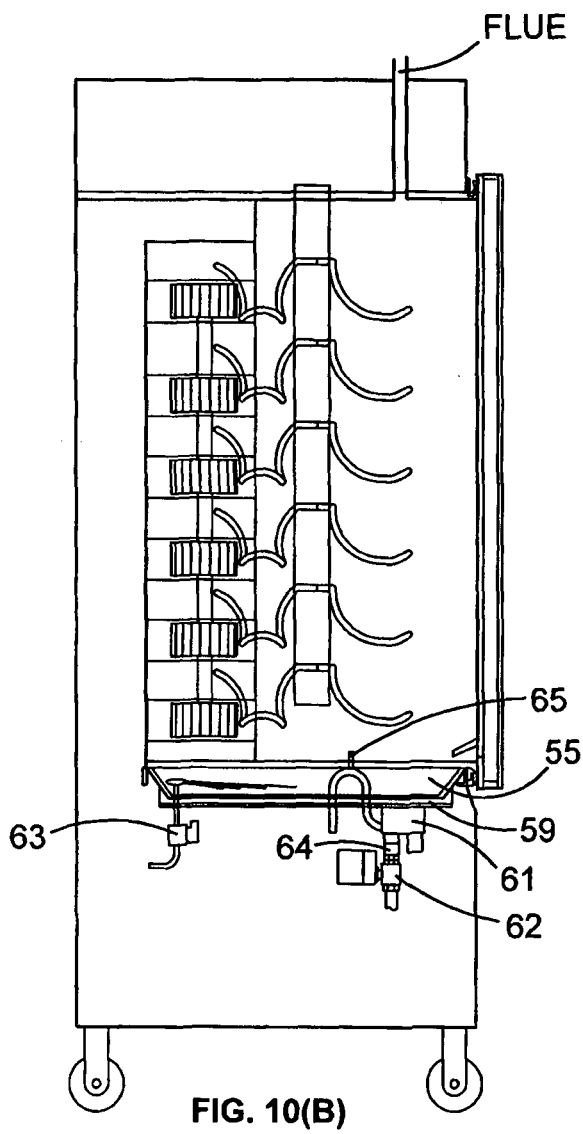

Each chamber floor is complete with—Spray nozzles 56 and 57, a floor heating element 59, a thermocouple 60 a floor drain and grate 61. Common to both chambers are—Motorized ball valve 62 water inflow solenoid 63 interconnecting level pipe to chamber 2, 64, Computer controller. (FIGS. 10a and 10b).

The water level is controlled by timing spraying of the spray nozzles, 56, 57; typically 1 minute spray time equals 4 liters of water. High water indicator 65 warns the operator by way of the electronics and touch screen, should the drain be clogged. Should no water be present from the spray jets, due to clogging or lack of water supply, the temperature of the floor will not reduce when water should be flowing in. This can be checked by the temperature thermocouple 60 and a fault code raised and/or ovens turned off. It has been found that steam made in this manner is more consistent, with less high pressure surges, avoiding the high flue exhaust wastage. Cooling of the oven from water inflow for steam manufacture is minimal, as the floor heater element 59 controls the boiling of the water and not the ovens main heating elements.

Both chamber 1 and chamber 2 fill with water and drain at the same time. Cross flow tube 64 insures both chambers are generally filled to the same water level.

Draining of the floor water during a bake can be random without effecting the bake or product. During the draining process, the spray nozzles 56 and 57 operate towards the end of the drain process to flush any waste on the floor to the drain grate 61. Floor heat is regulated precisely to ensure that steam is not made when it is not required. In this way, two chambers may bake at different intervals but can share a common drain and fill system.

Water is sent to drain as required by the computer program software, and mechanical ball valve 62 is opened and closed as required.

The water mains supply, after filtering (not shown) is introduced by a solenoid valve, 63 one valve supplying both chambers.

The oven floor, and a method of heating it, in addition to the hot air in the oven, and a method of controlling the temperature of the floor and the depth of the water, can be used as a very effective method of producing steam. A baking computer permits the required sequences to occur at the beginning, middle and/or end of each bake cycle or baking day.

Cleaning System

Modern ovens are self cleaning, meaning that there is a water spraying and washing system inside the oven chamber. This can be problematic due to high water usage, as the water in mostly not recirculated within the oven. Chemicals are required to clean the surfaces, as the water sprays are generally very low pressure and have low fluid velocity. A large amount of built up skin and remnants can clog drains or grates. Chemicals are expensive and can rot and damage the silicone rubber door seals and gaskets. The effluent can not be reused for typically cattle feed or soaps if chemicals have been used and are therefore likely to be present in any waste water.

FIGS. 11a, 11b, 11c, 11d, and 11e illustrates the cleaning system used in the invention which utilises a recirculating pump 66 and vertical spray pipe 67 to deliver recirculated water by way of coarse nozzles 68 one nozzle being aligned with each level of holders 9 on the turntable array. The rotatable shaft is non circular where the sprays contacts shaft and is shown as being 5 sided. Water sprays under pressure and at high velocity onto a five sided deflector 89. FIGS. 11a, 11b, 11c, 11d and 11e illustrate water sprays deflecting off deflector 89 and being caused to fan out into a spray. The position of the spray pipe 67 and five sided deflector 89 deflects the spray to the door glass 3 and oven internal walls and other internal structures.

The raw spray also contacts the item holders 9 at the best position for cleaning them. Item holders (see FIG. 4) are made typically of 10 mm diameter stainless steel round bar and are typically Teflon or ceramic coated.

Water is heated by element 59 in oven floor 55 to a predetermined temperature, and water level is increased also increasing the water volume to approximately 7 liters.

The hot water can run at high pressure as there are only 6 spray nozzles, 68 that can be simple parallel drilled holes of typically 3 mm in diameter, and the system is simple and reliable as the nozzles are large in diameter so are difficult to block. The deflecting of the sprays 70, FIGS. 11, 11a-11d from the five sided deflector 89 together with the deflection of the sprays off the holders 9, cause good coverage of the spray to all internal surfaces.

Figure 11:
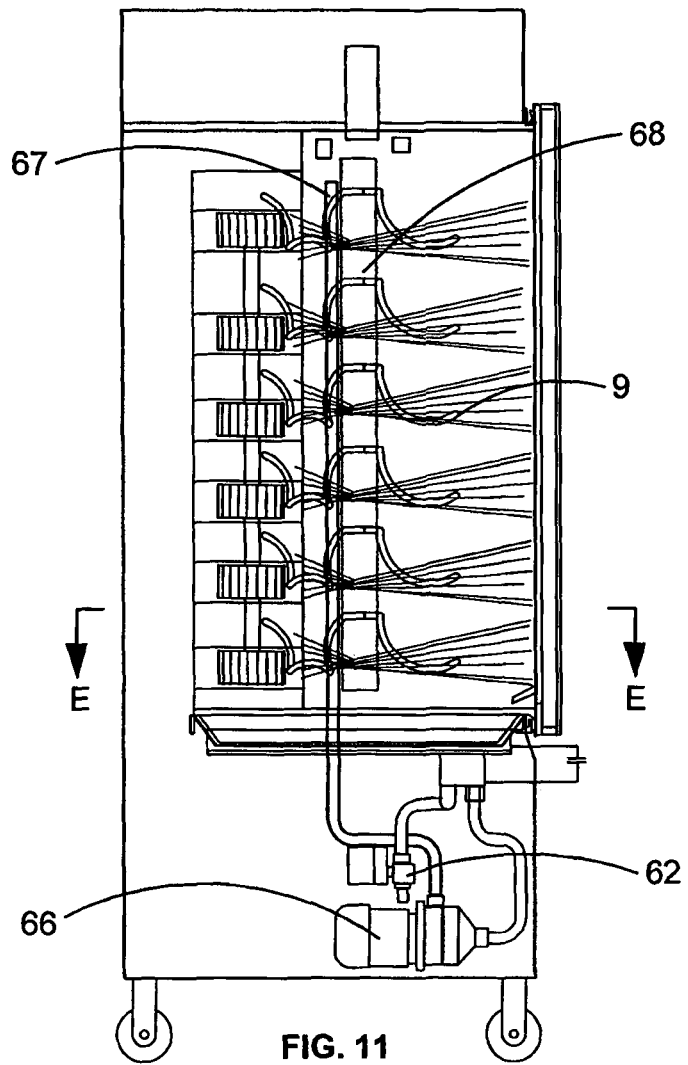
FIG. 11 is a sectional side view of an oven according to the embodiment of FIG. 1 showing the cleaning system employed in the invention.
Figure 11A:
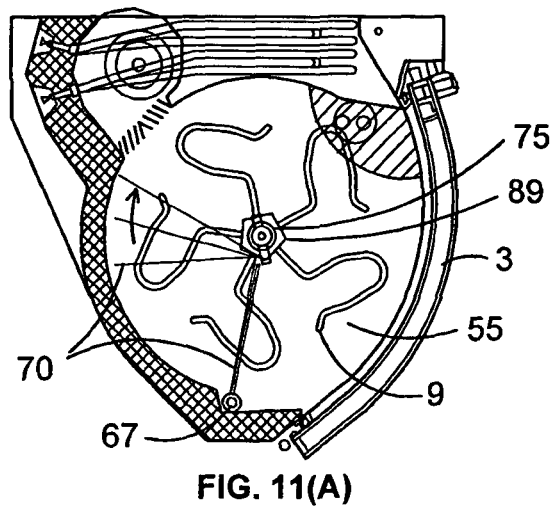
FIGS. 11(a), 11(b), 11(c) and 11(d) are sectional views through line E-E of FIG. 11 showing the action of the washing sprayers on the 5-sided shaft section at different positions in the rotation of the shaft.

FIG. 11a, illustrates the spray pipe 67 with water spray 70 deflecting and fanning out onto oven walls, by deflector 89. Note that holder 9 is also sprayed by the deflected spray 70, FIG. 11d.

Figure 11B:
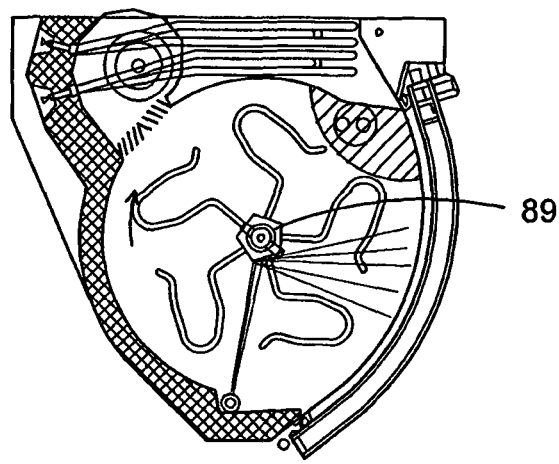

FIG. 11b illustrates the deflector 89 rotated further and spray is now directed to door glass 3.

Figure 11C:
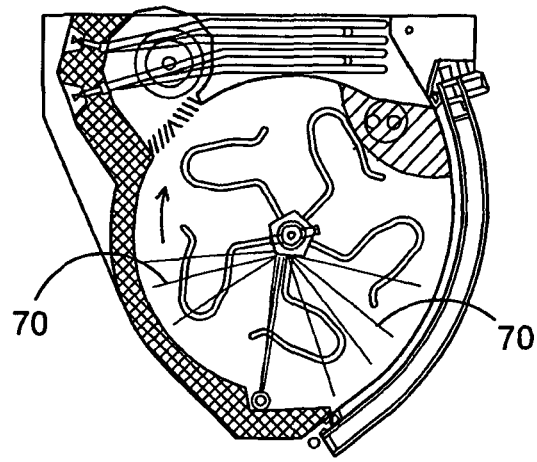

FIG. 11c illustrates the deflector 89 rotated further still, to where sprays 70 contact the glass door 3 but further across the glass, and oven internal wall.

Figure 11D:
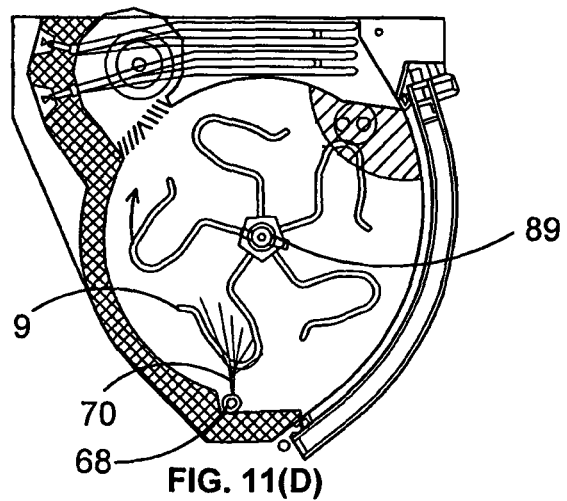

FIG. 11d illustrates the water spray 70 directly washing holder 9 as it passes nozzle 68; the velocity being greater coming directly from nozzle 68 rather than coming from deflector 89. Item holders 9 build up with fat and remnants particularly in the areas where this direct blast contacts holder 9. This is therefore a design advantage, as thorough cleaning of the holders is a hygiene requirement.

One pump provides sufficient flow and pressure to clean both ovens, however the use of a two way valve (not shown) would allow each oven to be spray cleaned independently.

Cleaning is done by—filling the floors of both chambers 1 and 2, spraying water from pump 66 through nozzles 68 and running the drive motor 26 to rotate central shaft 75 and the deflector 69. After an initial wash and soak, typically lasting 10 minutes, the pump 66 is turned off, and the motorized ball valve 62 is opened to drain the water in the floor. Water spray from nozzles 56, 57 is run while valve 62 is open to flush deposits from the oven floor 55. The cycle repeats, and then completes the cleaning process with a rinse cycle. Additives such as detergent can be added to the wash water at any time, in a manual or automatic process.

Loading System

Modern ovens often use roll in cartridges or racks to permit products to be preloaded and quickly rolled into the oven. The advantages of this system over loading and unloading products one by one through the oven doorway, is in oven efficiency, as the oven loses far less heat if the door is only open momentarily.

In a preferred form, the invention includes a rotatable centrally mounted item holding frame detachably mounted in the oven chamber. The holding frame includes at least one item holder mounted to a rotatable shaft. The rotatable shaft is mounted to a pivotally mounted loading arm. The loading arm is operable between a baking position where the frame is wholly within the oven chamber and a loading and unloading position where the item frame is wholly outside of the oven chamber. The oven includes an oven door for each oven chamber, the oven door opening on a travel path and the loading arm transports the item holding frame passed the oven door to the loading and unloading position. The oven chamber preferably has a circular cross section and the radius of the item racks on the item holder frame may be between 60 to 85% of the diameter of the baking chamber.

Figure 14A:
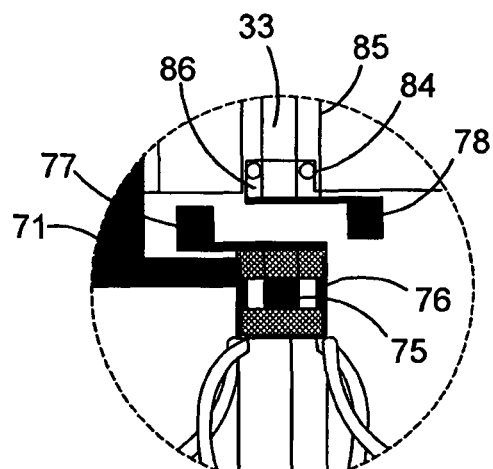
FIG. 14(a) is an exploded view of the mounting assembly identified in FIG. 14.
Figure 14:
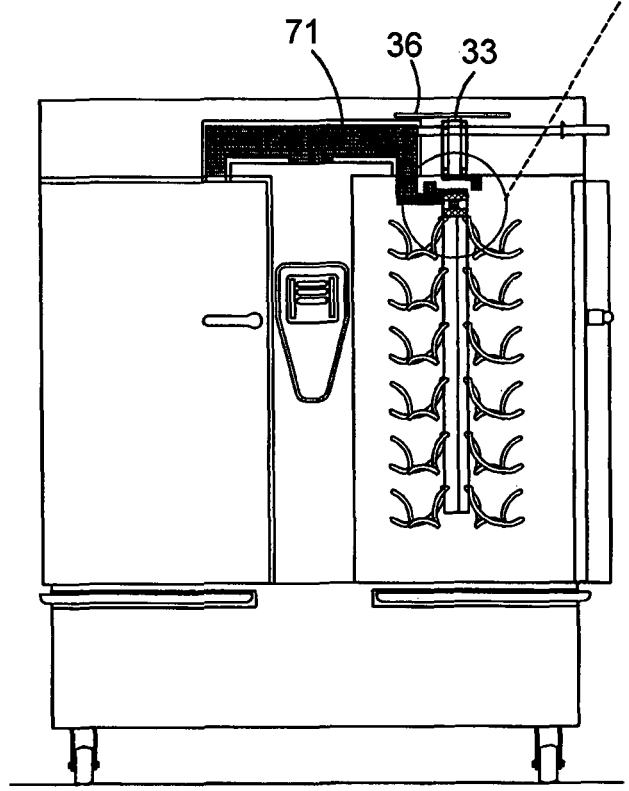
FIG. 14 is the front view of the oven of FIG. 12

FIGS. 12, 12a, 12b, and 12c illustrate an embodiment of this preferred feature. Loading arm 71 pivots from mounting point 72 and enters the oven by way of a wedge joint 73 in the roof of the oven 74. FIG. 14 illustrates the drive dog mechanism, and the central driven shaft 75 which is mounted in a bearing member 76 joined to loader arm 71 and driven by driven dog 77. Driving dog 78 is mounted in high temperature bearings 84 in bearing holder 85 and driven by sprocket 36. Heat baffle 86, preferably made of Teflon, reduces the heat effect on bearing 84.

Figure 13A:
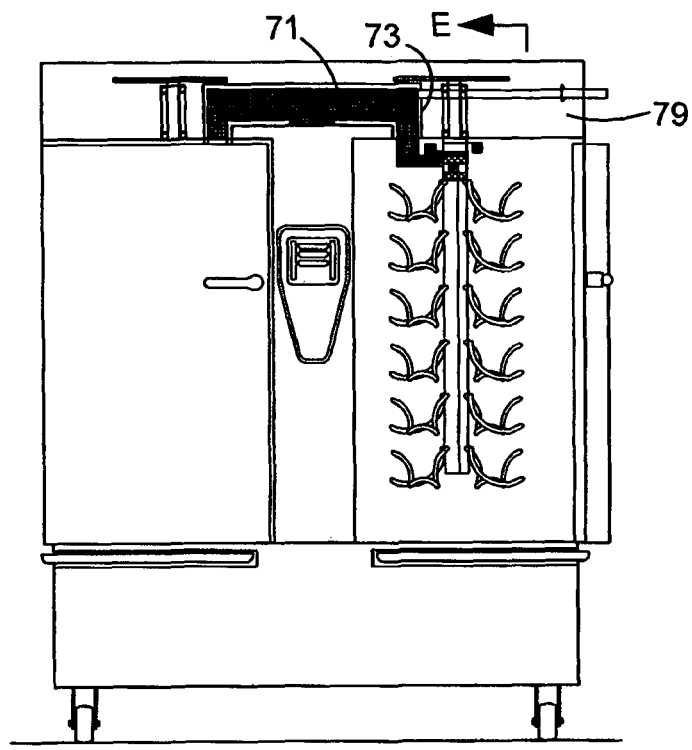
FIGS. 13(a), 13(b) and 13(c) are respectively the front, side and end views of the oven of FIG. 12 with one door open.
Figure 13B:
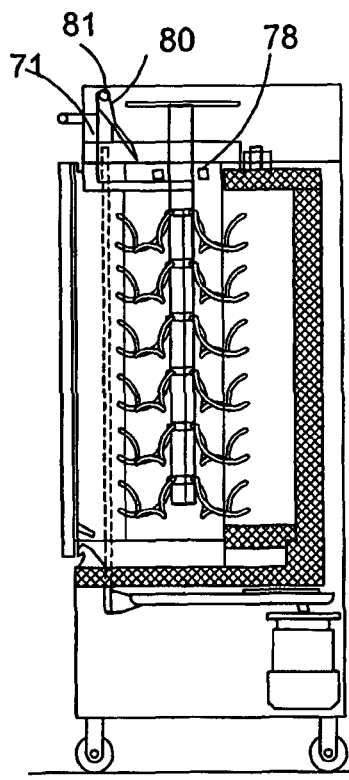
Figure 13C:
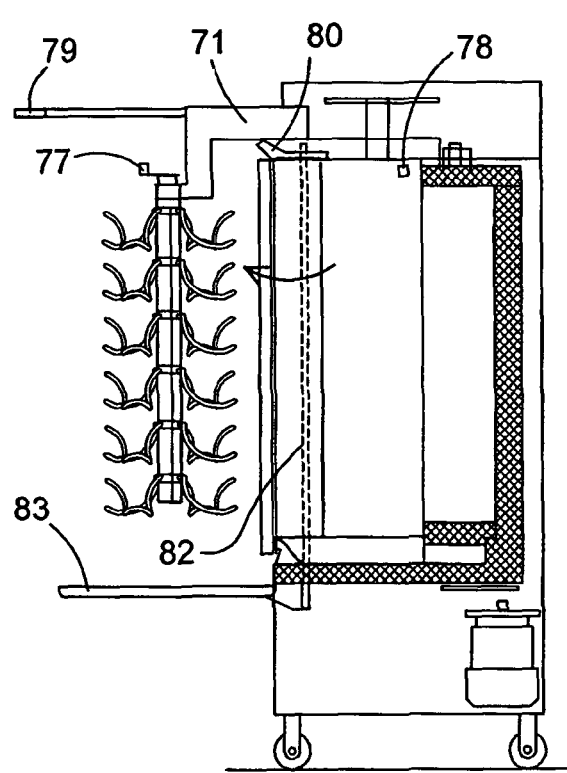

FIGS. 13a, 13b, and 13c illustrate the oven in front elevation (FIG. 13a) and sectional side elevation (FIG. 13b) shows the loader arm 71 in the closed position, while FIG. 13c shows the loader arm in the open position, with driven dog 77 released from driving dog 78 situated inside oven.

Handle 79 is used to open or close loader arm 71. Cover flap 80 is shown in FIG. 13c in closed position, and covers the wedge joint opening 73 when loader arm 71 is open. This is necessary to avoid excessive heat loss when oven is heating and loader arm 71 is open and being loaded. When loader arm 71 is closing, see B, roller 81 on cover flap 80 strikes the loader arm, 71 causing cover flap 80 to lift up. A counterbalance design of cover flap 80 causes it to self close when loader 71 is opened.

At the same time as loader 71 is opening, shaft 82 is rotated causing catch tray 83 to rotate out from under the oven, (FIG. 13c). This catch tray 83 is removable for daily cleaning, and is necessary for catching the dripping fat after baking, and blood and marinade before baking. Removal of the chickens often causes loss of stuffing and so catch tray 83 is best manually removed for cleaning each day.

FIGS. 15a, 15b, 15c, 15d, illustrate the connection of item holders 9 to the rotatable holder frame or central shaft at deflector section 89. Deflector section 89 is held in place by button lugs 87 by pushing deflector section over button lugs 87 and pushing down to anchor button lug in slot 88 Button lugs in turn are connected to central driven shaft 75.

Figure 15A:
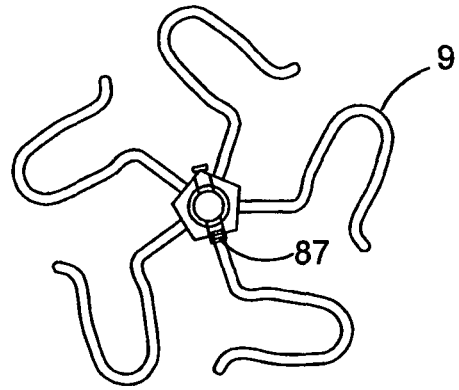
FIG. 15(a) is a plan view of an item holding frame according to the invention, 15(b) is a front view of the item holding frame of FIG. 15(a), 15(c) is a side view showing the construction of the item holding frame, 15(d) is a view of the section of FIG. 15(c0 rotated through 90° and 15(e) is a plan view of a shelf which may be used as an alternative to the item holders.
Figure 15B:
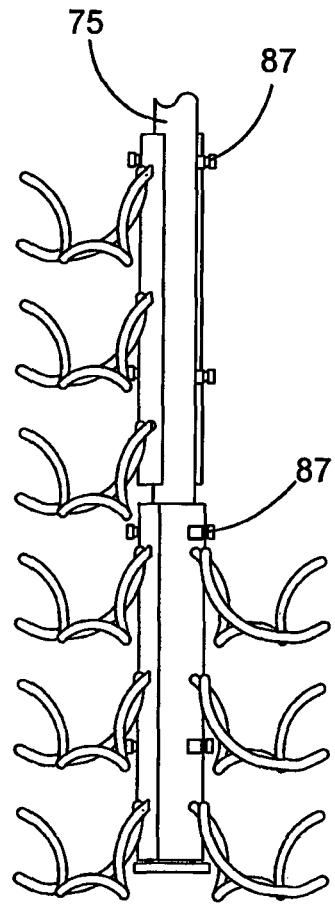
Figure 15C:
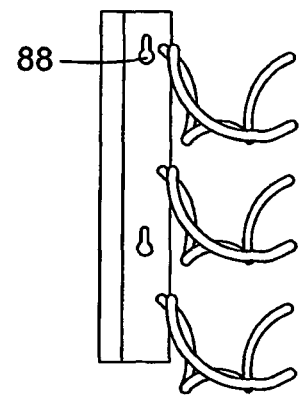
Figure 15D:
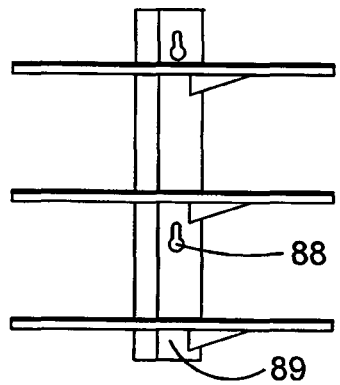
Figure 15E:
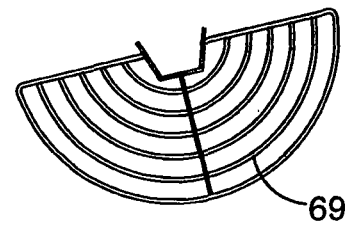

Optional holding rack 69, (FIG. 15e) may be used in place of item holder 9 when products are baked that do not suit the item holder design. A combination of item holders 9 and holding rack 69 is also possible on the same central shaft 75 should a variety of chickens and other items need baking at once.

Figure 12:
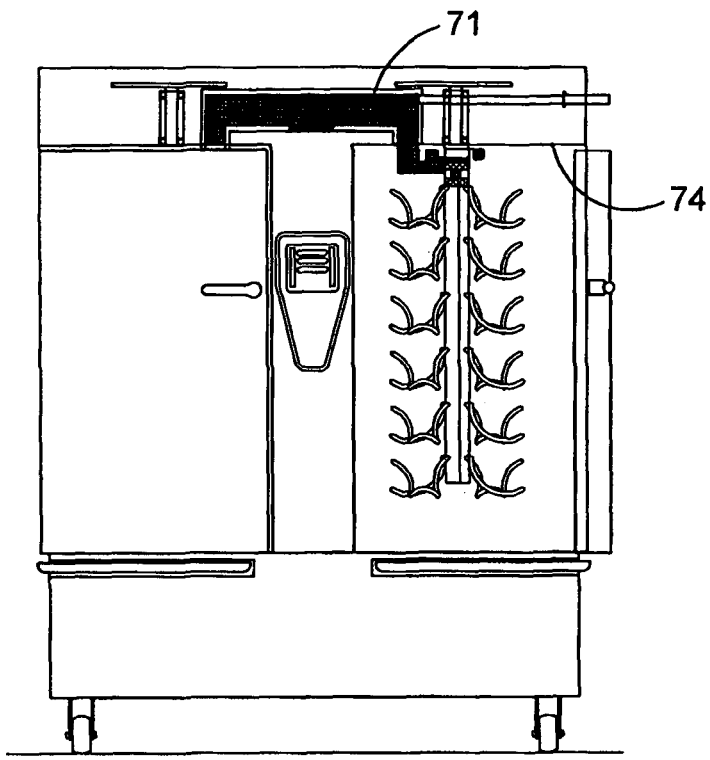
FIG. 12 is a front view of an oven of FIG. 1 showing one door open.
Figure 12A:
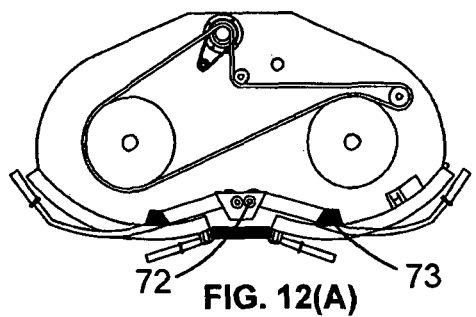
FIGS. 12(a), 12(b) and 12(c) are plan views of the embodiment of FIG. 12 with the top removed showing the operation of the loading mechanism and drive mechanism for the rotatable shafts.
Figure 12B:
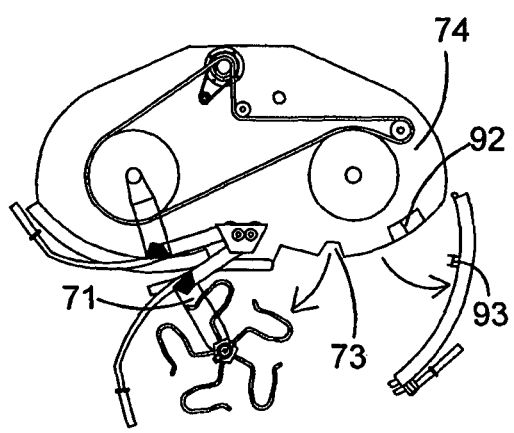
Figure 12C:
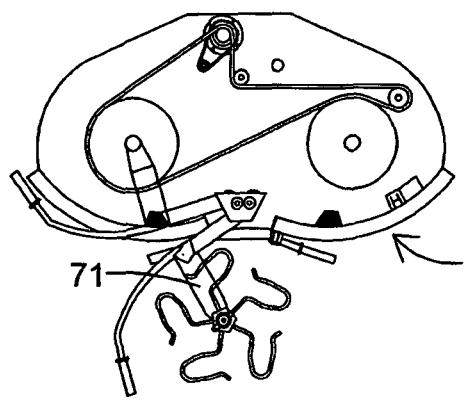

To avoid accidental opening of the oven door 3, a locking key switch 92 and key tag 93 is connected between oven door 3 and oven chamber 1, 2 (FIG. 12). This locks the door 3 from opening, and permits door to open only when safe to do so. It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. An oven comprising:
    an oven chamber, comprising side walls, a floor and a ceiling, the oven chamber having a plurality of heating levels;
    at least one heating element cavity external to and communicating with the oven chamber, the heating element cavity comprising at least one heating element;
    a plurality of item holders arranged vertically in multiple levels of at least one item holder, each item holder being rotatable about an axis in the oven chamber;
    a plurality of air inlets into the oven chamber from the heating element cavity, each of the multiple levels of rotating item holders being supplied directly with heated air from a corresponding one of the air inlets, and at least one outlet for return air from the oven chamber into the heating element cavity; and
    an air distributor comprising a plurality of fans corresponding to each air inlet, the air distributor circulating air from the heating element cavity to the oven chamber.

2. The oven of claim 1 wherein the outlet from the oven chamber to the heating element cavity is provided with a filter and the air distributor is provided with a fan to draw air past the filter into proximity with the heating elements.

3. The oven of claim 1 wherein each level of item holder comprises at least two racks upon which items are roasted.

4. The oven of claim 1 wherein each item holder is adapted to support a single item to be roasted.

5. The oven of claim 4 wherein the air inlets to the oven chamber are provided with vanes to direct the heated air from the cavity directly onto the rotating item holders.

6. The oven of claim 5 wherein the vanes direct the heated air upwardly onto the rotating holders.

7. The oven of claim 2 wherein the plurality of fans of the air distributor are coaxially engaged on a fan drive mechanism.

8. An oven comprising:
    an oven chamber comprising side walls, a floor and a ceiling, the oven chamber having a plurality of heating levels;
    at least one heating element cavity external to and communicating with the oven chamber, the heating element cavity comprising at least one heating element;
    a plurality of air inlets into the oven chamber from the heating element cavity corresponding to the heating levels in the oven chamber and at least one outlet for return air from the oven chamber into the heating element cavity;
    an air distributor comprising at least one fan circulating air from the heating element cavity to the oven chamber; and
    a rotatable centrally mounted item holding frame detachably mounted in each oven chamber including at least one item holder mounted to a rotatable shaft in each oven chamber, the item holding frames being centrally mounted in the oven chambers within a shaft assembly in the oven chambers of the oven, the shaft assembly being provided with a rack drive mechanism which is engageable with a drive key associated with the rotatable shafts to rotate the shafts, at least one fan coaxially engaging on a fan drive mechanism whereby the fan drive mechanism is coupled to the rack drive mechanism and both are driven from a single motor.

9. The oven of claim 8 wherein the number of fans in the air distributor is equal to the number heating elements and the number of heating levels.

10. An oven comprising:
    an oven chamber comprising side walls, a floor and a ceiling, the oven chamber having a plurality of heating levels;
    at least one heating element cavity external to and communicating with the oven chamber, the heating element cavity comprising at least one heating element;
    a plurality of item holders vertically arranged in multiple levels of at least one item holder, each item holder being rotatable about an axis in the oven chamber;
    a plurality of air inlets into the oven chamber from the heating element cavity corresponding to the heating levels in the oven chamber and at least one outlet for return air from the oven chamber into the heating element cavity; each air inlet to the oven chamber directing the heated air from the heating element cavity directly onto a corresponding level of rotating item holder;
    an air distributor comprises a plurality of fans corresponding to each air inlet, the air distributor circulating air from the heating element cavity to the oven chamber;
    a water inlet to supply water to the oven chamber, a secondary heating element located in the floor to heat the floor to generate stream from water in the oven chamber; and
    a controller to operate the water inlet to project water onto the heated oven floor when steam is required.

11. The oven of claim 10, wherein the water outlet is located centrally in the oven floor.

12. An oven comprising:
- an oven chamber, the oven chamber comprising side walls, a floor and a ceiling, the oven chamber having a plurality of heating levels;
- at least one heating element cavity external to and communicating with the oven chamber, each heating element cavity comprising at least one heating element;
- a plurality of air inlets into the oven chamber from the heating element cavity corresponding to the heating levels in the oven chamber and at least one outlet for return air from the oven chamber into the heating element cavity;
- an air distributor comprises a plurality of fans corresponding to each air inlet, the air distributor circulating air from the heating element cavity to the oven chamber; and
- a rotatable centrally mounted item holding frame detachably mounted in the oven chamber including the multiple levels of at least one item holder mounted to a rotatable shaft, the rotatable shaft being mounted to a pivotally mounted loading arm, the loading arm operable between a baking position where the frame is wholly within the oven chamber and a loading and unloading position where the item frame is wholly outside of the oven chamber.

13. The oven of claim 12 wherein the item holding frame is centrally mounted in the baking chamber within a shaft assembly in the baking chamber of the oven, the item holder frame comprising a plurality of item holders, each item holder being adapted to support a single item to be roasted.

14. The oven of claim 12 wherein a shaft assembly for mounting the item holding frame in the baking chamber is provided with a rack drive mechanism which is engageable with a drive key associated with the rotatable shaft to rotate the rotatable shaft.

15. The oven of claim 13 wherein the fan drive mechanism is coupled to the rack drive mechanism and both are driven from a single motor.

16. The oven of claim 12 further comprising an oven door, the oven door opening on a travel path and the loading arm transports the item holding frame passed the oven door to the loading and unloading position.

17. The oven of claim 12 wherein the oven chamber has a circular cross section and the radius of the item racks on the item holder frame is between 60 to 85% of the diameter of the baking chamber.

18. The oven of claim 12 wherein heated air enters the oven chamber from the heating element cavity at multiple levels, the number of levels corresponding to the number of levels of item holders on the frame.

19. The oven of claim 12 wherein the item holder comprises a frame connection arm connectible to the rotatable shaft and two item support arms connected in a substantially U-shaped configuration, one item support arm being connected to the frame connection arm whereby the two item support arms form a concave shape which receives the item to be roasted.

20. An oven comprising:
- at least two oven chambers, each oven chamber comprising side walls, a floor and a ceiling, each oven chamber having a plurality of heating levels;
- at least one heating element cavity external to and communicating with each oven chamber, each heating element cavity comprising at least one heating element;
- a plurality of air inlets into each oven chamber from the heating element cavity corresponding to the heating levels in each oven chamber and at least one outlet for return air from each oven chamber into the heating element cavity; and
- an air distributor comprises a plurality of fans corresponding to each air inlet, the air distributor circulating air from the heating element cavity to each oven chamber, a rotatable centrally mounted item holding frame detachably mounted in each oven chamber including at least one item holder mounted to a rotatable shaft in each oven chamber, the item holding frames being centrally mounted in each oven chamber within a shaft assembly in each oven chamber, the shaft assembly being provided with a rack drive mechanism which is engageable with a drive key associated with the rotatable shafts to rotate the rotatable shafts, the plurality of fans coaxially engaging on a fan drive mechanism whereby the fan drive mechanism is coupled to the rack drive mechanism and both are driven from a single motor.

21. The oven of claim 17 wherein the plurality of fans of the air distributor are coaxially engaged on a fan drive mechanism.

* * * * *